United States Patent [19]
Riley et al.

[11] Patent Number: 5,531,633
[45] Date of Patent: Jul. 2, 1996

[54] METHOD OF MACHINING A METAL WORKPIECE

[75] Inventors: James R. Riley, Mayfield; Othel C. Richards, Clinton, both of Ky.

[73] Assignee: Ingersoll-Rand Company, Woodcliff Lake, N.J.

[21] Appl. No.: 217,788

[22] Filed: Mar. 24, 1994

[51] Int. Cl.$^6$ .................................................. B24B 1/00
[52] U.S. Cl. ........................... 451/28; 451/398; 451/49; 29/889.23
[58] Field of Search ................................ 451/397, 398, 451/49, 28; 29/889.23

[56] References Cited

U.S. PATENT DOCUMENTS

| | | | |
|---|---|---|---|
| 835,320 | 11/1906 | Pomeroy | 451/398 |
| 2,173,530 | 9/1939 | Blazek | 451/460 |
| 2,960,806 | 11/1960 | Kunzler | 451/398 |
| 3,299,583 | 1/1967 | Atwater | 451/49 |
| 3,427,761 | 2/1969 | Kulson | 451/398 |
| 3,830,021 | 8/1974 | Blum et al. | 451/390 |
| 3,877,151 | 4/1975 | Roberts | 451/49 |
| 4,109,420 | 8/1978 | Giaccherino | 451/398 |
| 4,704,824 | 11/1987 | Horner | 451/28 |
| 5,022,195 | 6/1991 | Cattelain et al. | 451/51 |
| 5,259,156 | 11/1993 | Ronen | 451/397 |
| 5,339,521 | 8/1994 | Kawase | 451/49 |

*Primary Examiner*—Robert A. Rose
*Attorney, Agent, or Firm*—Michael M. Gnibus

[57] ABSTRACT

In combination with a lathe having a headstock and a tailstock, a method of machining a metal workpiece includes: forming in a first end of the metal workpiece a cavity; positioning a spherical member in a predetermined position within the cavity; fixedly locating the spherical member in the predetermined position; mounting a second end of the metal workpiece in driving relation with the machine headstock; providing a means for rotatably supporting the first end of the metal workpiece; forming in a first end of the rotatable support means a cavity suitably dimensioned to conformably receive a predetermined portion of the spherical member; mounting a second end of the rotatable support means in the tailstock; mounting the first end of the metal workpiece in rotatable supporting relation with respect to the first end of the rotatable support means such that the cavity of the first end of the rotatable support means supportingly receives a predetermined portion of the spherical member which extends from the first end of the metal workpiece; rotating the metal workpiece such that the spherical member spins freely within the cavity of the rotatable support means; and machining the metal workpiece to a predetermined shape.

6 Claims, 2 Drawing Sheets

METHOD OF MACHINING A METAL WORKPIECE

BACKGROUND OF THE INVENTION

This invention generally relates to metalworking, and more particularly to a method of machining a metal workpiece, such as a titanium workpiece, which reduces adhesive wear between a machine tool, or machine tool subassembly, and the metal workpiece during the machining thereof.

In the course of modern manufacturing, machine tools are employed to deform and to dimension metal to produce a part having a desired shape. A type of machine tool often used in this purpose is a lathe, which in its simplest form is a machine for holding and rotating a workpiece against a single-point cutting tool. By feeding the cutting tool into the workpiece and along a lathe axis of rotation, any desired cylindrical contour can be produced.

As is well known in the art, the principal components of the lathe are a bed, a headstock, a tailstock and a carriage. It has been discovered that when using a lathe to machine certain metals, such as titanium for example, adhesive wear, such as galling, occurs on the metal workpiece at its juncture with the non-driving end of the lathe, such as the tailstock or other workpiece support assembly employed by the lathe. This adhesive wear often causes the workpiece to eccentrically rotate about the lathe axis of rotation which causes the workpiece to be machined with dimensions which may be out of tolerance. In severe situations, the tailstock may bond to the workpiece.

As used herein, galling means a type of adhesive wear which is caused by an imbalance of electrons existing between two mating metal surfaces. In this regard, when material is subject to galling under low stresses, minute junctions form at contacting surfaces and small fragments of the metals become detached with subsequent movement. When material is subject to galling under high stresses, large junctions are formed, or actual seizure may occur between the materials.

The foregoing illustrates limitations known to exist in present methods for machining certain metals. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a method of machining a metal workpiece for use in combination with a metalworking machine in which the metal workpiece is rotated about a horizontal axis which extends from a machine headstock to a machine tailstock. The method is accomplished by forming in a first end of the metal workpiece a cavity having predetermined dimensions. A spherical member is positioned in a predetermined position within the cavity such that a portion of the spherical member extends out from the cavity past the first end of the metal workpiece. The spherical member is fixedly located in the predetermined position. A second end of the metal workpiece is mounted in driving relation with the machine headstock. A means for rotatably supporting the first end of the metal workpiece is provided. A cavity suitably dimensioned to conformably receive a predetermined portion of the spherical member is formed in a first end of the rotatable support means. A second end of the rotatable support means is mounted in the tailstock. The first end of the metal workpiece is mounted in rotatable supporting relation with respect to the first end of the rotatable support means such that the cavity of the first end of the rotatable support means supportingly receives a predetermined portion of the spherical member which extends from the first end of the metal workpiece. Thereafter, the metal workpiece is rotated about the horizontal axis such that the spherical member spins freely within the cavity of the rotatable support means, and the metal workpiece is machined to a predetermined shape.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
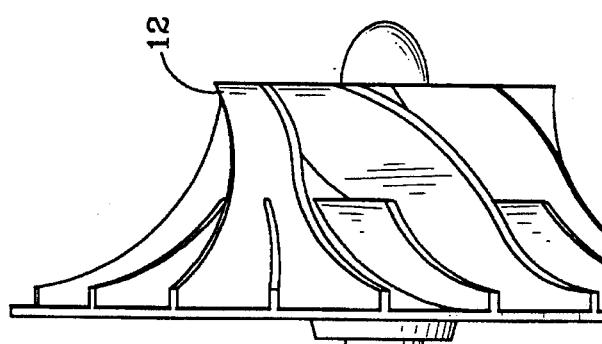
FIG. 1 is an exploded, side elevational view of an impeller and a shaft or pinion of a centrifugal compressor.

Referring now to the drawings, wherein similar reference characters designate corresponding parts throughout the several views, FIG. 1 illustrates a pinion 10 and an impeller 12 which are designed for use in a centrifugal compressor (not shown).

The pinion 10 includes gearing 14 which is engageable with a power transmission assembly (not shown) which drives the pinion about a pinion axis at a predetermined rotational velocity during operation of the centrifugal compressor. The pinion 10 typically is manufactured from alloy steel, such as but not limited to, AMS 6260 or AISI 8620 alloy steel. The pinion 10 includes a driving end 16 which has formed therein a polygonally dimensioned bore 20. The polygonally dimensioned bore 20 has an interior bore surface which defines a generally triangular cross section composed of circular arcs.

Figure 2:
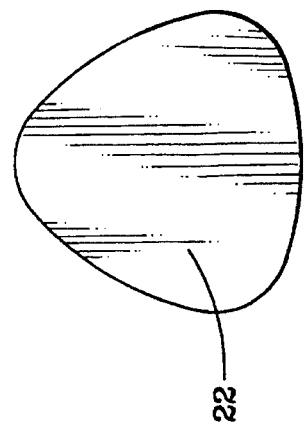
FIG. 2 is an end view of a polygonally dimensioned stem portion of the impeller illustrated in FIG. 1.

The impeller 12 incorporates a backward-leaning type geometry, and the impeller includes a polygonally dimensioned stem portion 22 which is defined by an exterior stem surface, and which is illustrated in FIG. 2. The stem portion 22 includes a first end 22a and a second end 22b. The polygonally dimensioned stem portion 22 is suitably matingly dimensioned to be received by the polygonally dimensioned bore 20.

Heretofore, the impeller 12 has been machined from a single block of forged titanium. During the machining of the impeller 12, the stem portion 22 is machined and dimensioned to be matingly received by the polygonally dimensioned bore 20. The stem portion 22 is typically dimensioned to have a cross section which deviates from a circular pattern and which has a shape that is convex on all sides and essentially elliptical, triangular or quadratic as illustrated in FIG. 2. Also, the stem portion 22 is dimensioned to a diameter tolerance of less than 0.0002 of an inch or runout of less than 0.0001 of an inch.

Figure 3:
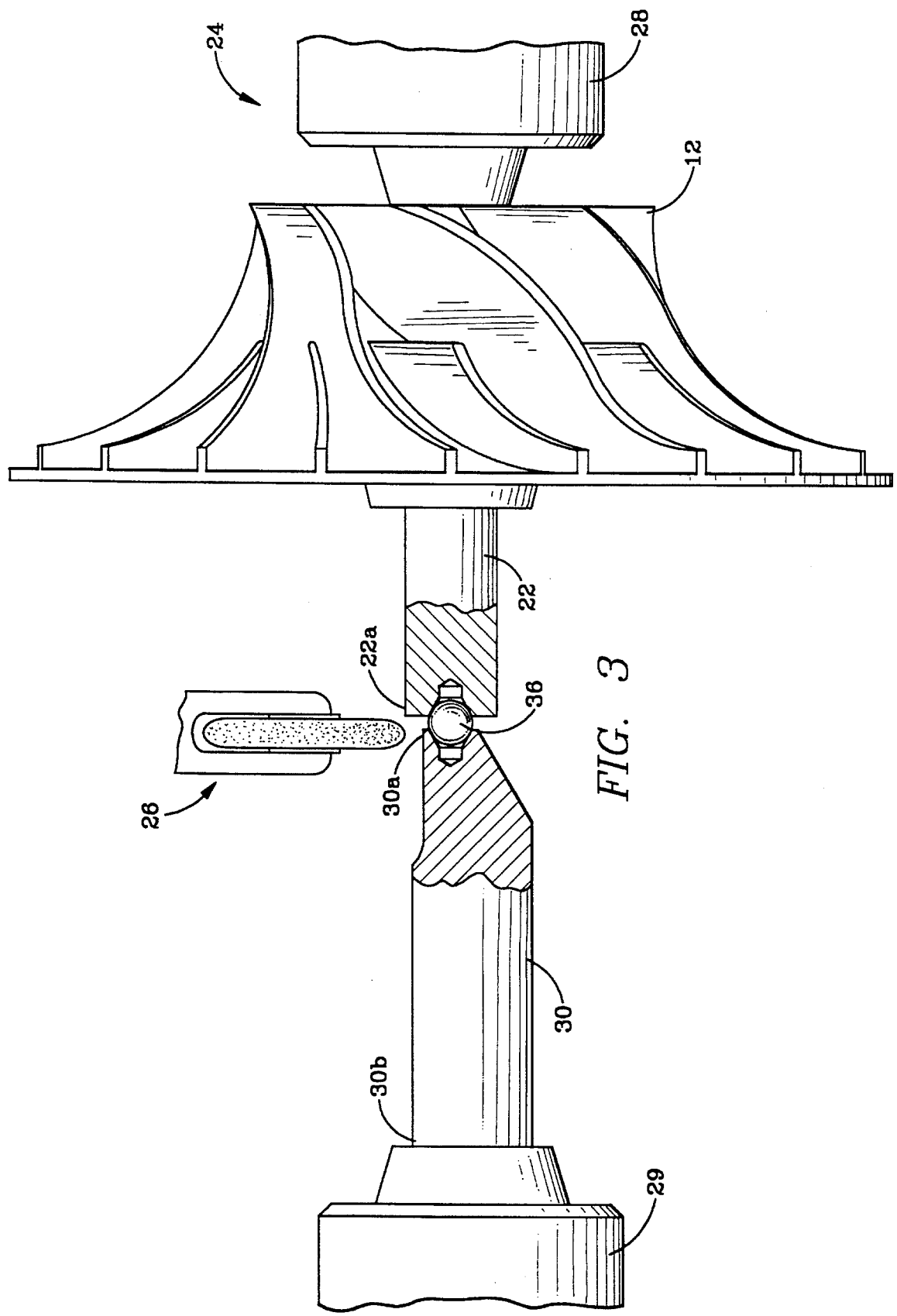
FIG. 3 is a partial view of a lathe assembly in combination with a grinding assembly which together are arranged to machine a metal workpiece in accordance with the method of the present invention.

FIG. 3 is a partial illustration of a lathe assembly, generally at 24, in combination with a grinding assembly, generally at 26, which together are arranged to machine the stem portion 22 of the impeller 12 in accordance with the method of the present invention. The lathe 24 includes a headstock 28 and a tailstock 29. The headstock rotationally drives the impeller about a lathe axis of rotation as is well known in the art.

As previously discussed, to date, during the machining of the titanium stem portion 22, adhesive wear, such as galling, typically has occurred between a conventional tailstock assembly (not shown), which rotationally supports the stem portion 22, and the stem portion 22 of the impeller 12. This adhesive wear has caused the impeller to eccentrically rotate about the lathe axis of rotation which has caused the impeller 12 to be machined with dimensions out of tolerance. In severe situations, the tailstock has bonded to the stem portion 22 necessitating that the individual impeller be scrapped. The present invention provides a method for machining a metal workpiece, such as the impeller 12, which substantially eliminates the adhesive wear which has heretofore occurred at the juncture of the tailstock and the impeller 12.

Figure 4:
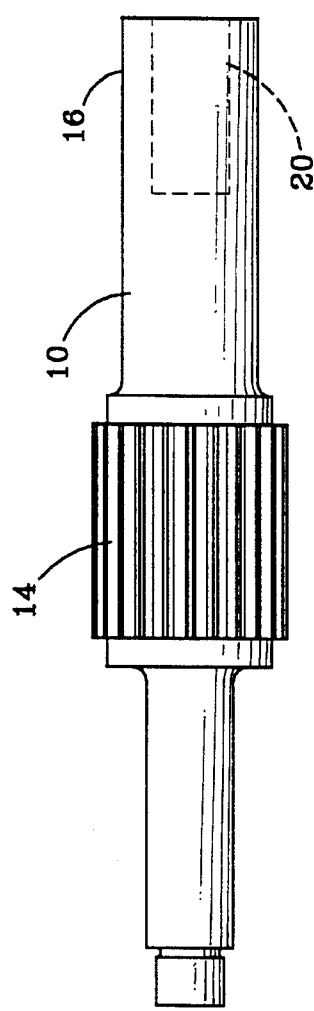
FIG. 4 is a partial, exploded view of the arrangement in FIG. 3.
Figure 4:
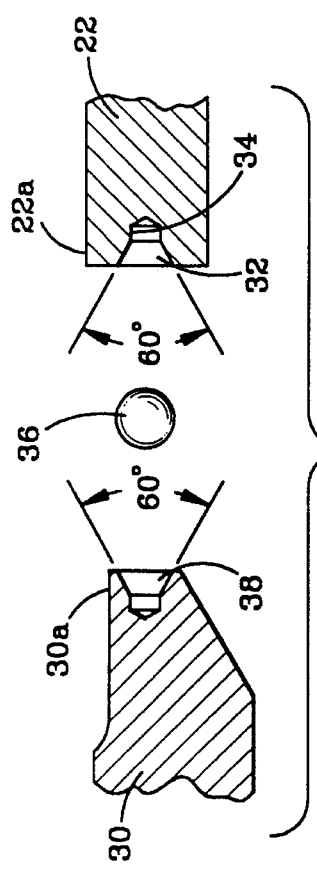

In accordance with the preferred method of the present invention and as illustrated in FIGS. 3 and 4, a cavity 32 is formed in a first end 22a of the stem portion 22. The cavity 32 is generally concave having an interior wall portion which forms a sixty degree included angle with the first end of the metal workpiece as illustrated by FIG. 4. The cavity 32 may be dimensioned to include a reservoir portion 34 which may contain a predetermined volume of adhesive as will be explained in further detail hereinafter.

As best illustrated by FIG. 3, a spherical member 36, such as a precision ball bearing, is positioned within the cavity 32 in a predetermined position such that a portion of the ball bearing extends out from the cavity past the first end 22a of the stem portion 22. Thereafter, the ball bearing is fixedly located within the cavity 32. In the preferred method of the present invention, a liquid adhesive is deposited in the cavity 32, and the liquid adhesive collects in the reservoir 34. An adhesive which has proven particularly effective for the purposes of the present invention is LOCTITE® super bond #420. (LOCTITE is a registered trademark of the Loctite Corporation having a principal place of business in Hartford, Conn.) Once the ball bearing has been fixedly located within the cavity 32, the impeller 12 is operably connected to the lathe headstock 28 which will cause the impeller 12 and stem portion 22 to rotate about an axis which extends from the headstock 28 to the tailstock 29, as is well known in the art.

A rotatable support means, such as a dead center 30, is provided for rotatably supporting the first end of the impeller 12. The dead center 30 includes a first end 30a and a second end 30b. A cavity 38 is formed in the first end 30a of the dead center 30. The cavity is suitably dimensioned to conformably receive a predetermined portion of the spherical member 36. The cavity 38 is concave having an interior wall portion which forms a sixty degree included angle with the first end of the rotatable support means, as illustrated in FIG. 4. The second end of the dead center is then mounted in the tailstock 29.

Prior to machining the impeller stem portion, the first end 22a of the stem portion 22 is mounted in rotatable supporting relation with respect to the first end 30a of the dead center 30. When suitably mounted thereto, the cavity 38 of the first end 30a of the dead center 30 supportingly receives a predetermined portion of the spherical member 36 which extends from the first end 22a of the stem portion 22.

Once the titanium impeller 12 has been prepared for machining on a lathe in accordance with the method of the present invention, the impeller is rotated, by action of the headstock 28, about the horizontal axis such that the spherical member 36 spins freely within the cavity of the rotatable support means thereby eliminating adhesive wear at the stem portion 22. The titanium impeller is then machined to a predetermined shape. After the machining is completed, the spherical member 36 is removed from the stem portion 22 by effective application of a suitable adhesive solvent.

While this invention has been illustrated and described in accordance with a preferred embodiment, it is recognized that variations and changes may be made therein without departing from the invention as set forth in the following claims.

Having described the invention, what is claimed is:

1. In combination with a metalworking machine in which a metal workpiece is rotated about a horizontal axis which extends from a machine headstock to a machine tailstock, a method of machining the metal workpiece comprising the following steps:

forming in a first end of the metal workpiece a cavity having predetermined dimensions;

positioning a spherical member in a predetermined position within the cavity such that a portion of the spherical member extends out from the cavity past the first end of the metal workpiece;

fixedly locating the spherical member in the predetermined position;

mounting a second end of the metal workpiece in driving relation with the machine headstock;

providing a means for rotatably supporting the first end of the metal workpiece;

forming in a first end of the rotatable support means a cavity suitably dimensioned to conformably receive a predetermined portion of the spherical member;

mounting a second end of the rotatable support means in the tailstock;

mounting the first end of the metal workpiece in rotatable supporting relation with respect to the first end of the rotatable support means such that the cavity of the first end of the rotatable support means supportingly receives a predetermined portion of the spherical member which extends from the first end of the metal workpiece;

rotating the metal workpiece about the horizontal axis such that the predetermined portion of the spherical member spins freely within the cavity of the rotatable support means; and machining the metal workpiece to a predetermined shape.

2. The method of machining a metal workpiece, as claimed in claim 1, and wherein the metal workpiece is made from titanium.

3. The method of machining a metal workpiece, as claimed in claim 1, further comprising the step of adhesively locating the spherical member in the predetermined position within the workpiece cavity.

4. The method of machining a metal workpiece, as claimed in claim 1, further comprising the step of forming a concave, substantially circular shaped cavity in the first end of the metal workpiece, and wherein the substantially circular shaped cavity is defined by an interior wall portion which forms a sixty degree included angle with the first end of the metal workpiece.

5. The method of machining a metal workpiece, as claimed in claim 1, further comprising the step of forming a concave, substantially circular shaped cavity in the first end of the rotatable support means, and wherein the substantially circular shaped cavity is defined by an interior wall portion which forms a sixty degree included angle with the first end of the rotatable support means.

6. The method of machining a metal workpiece, as claimed in claim 1, and wherein the spherical member is a ball bearing.

* * * * *